United States Patent [19]

Conti

[11] Patent Number: 5,493,069
[45] Date of Patent: Feb. 20, 1996

[54] METHOD OF ULTRASONICALLY WELDING TOGETHER TWO CONDUCTORS

[75] Inventor: Richard F. Conti, Langhorne, Pa.

[73] Assignee: Heraeus Sensor GmbH, Kleinostheim, Germany

[21] Appl. No.: 298,865

[22] Filed: Aug. 31, 1994

[51] Int. Cl.⁶ .................................................. B23K 20/10
[52] U.S. Cl. .......................... 174/94 R; 228/111; 174/90
[58] Field of Search ................................ 228/110.1, 111; 174/90, 94 R

[56] References Cited

U.S. PATENT DOCUMENTS

| | | | |
|---|---|---|---|
| 3,688,245 | 8/1972 | Lockshaw | 174/94 R X |
| 3,848,792 | 11/1974 | Mims | 228/110.1 X |
| 4,817,814 | 4/1989 | Coto et al. | 228/110.1 |

*Primary Examiner*—Kenneth J. Ramsey
*Attorney, Agent, or Firm*—Panitch Schwarze Jacobs & Nadel

[57] ABSTRACT

An improved method of ultrasonically welding together two conductors having differing lateral dimensions comprising selecting a welding capture fixture having lateral sides spaced apart by a distance substantially equal to the lateral dimension of a first conductor having the greatest lateral dimension. The first conductor is placed in the selected fixture so that the first conductor is proximate to or substantially engages both lateral sides of the fixture. The second conductor is formed so that at least a first portion extends laterally beyond a second portion. The second conductor is placed into the select fixture so that the first portion is proximate to or substantially engages one of the lateral sides of the fixture and the second portion is proximate to or substantially engages the other lateral side of the fixture with both portions substantially engaging the first conductor. Ultrasonic energy is applied to one of the conductors within the fixture for moving the one conductor with respect to the other conductor for welding the conductors together. In a preferred embodiment, one of the conductors is an electrical lead of a sensing element and the other conductor is a multi-stranded extension wire.

13 Claims, 2 Drawing Sheets

METHOD OF ULTRASONICALLY WELDING TOGETHER TWO CONDUCTORS

FIELD OF THE INVENTION

The present invention relates generally to ultrasonic welding of conductors and, more particularly, to an improved method of ultrasonically welding together two conductors of differing lateral dimensions.

BACKGROUND OF THE INVENTION

In many applications, it is necessary or desirable to bond together two electrical conductors. For example, it is often necessary to form an electrical connection between a sensing element or device and electrical instrumentation employed for the purpose of interpreting electrical signals from the sensing element device and providing a usable output. In particular, sensing elements such as bi-metal thermocouples, thermosensors including PRTDs and NTs, thermistors, semiconductor diodes, and the like, are often formed by their manufacturers with one or more conductive leads extending outwardly from the sensing element for a relatively short distance, for example, four to ten millimeters. In order to effectively utilize such sensing element, it is necessary to electrically extend the short electrical leads from the sensing element to electrical or electronic instrumentation which could be located a substantial distance away from the sensing element, particularly if the sensing element is located in a harsh or hazardous environment. Typically, an extension cable or wire of the appropriate length is electrically connected on one end to each sensing element lead and on the other end to the instrumentation equipment either directly or through other cables, connectors, networks, or the like. Such extension wires are typically multi-stranded aluminum, copper, or thermocouple alloy wires which are covered with a suitable electrical insulating material.

Many different techniques may be employed for electrically connecting one end of such an extension wire to a lead of a sensing element. Such techniques include resistive welding, brazing, soft soldering, silver soldering, mechanical crimping, laser fusion and ultrasonic welding, sometimes referred to simply as ultrasonic or acoustic welding. Each such technique has its own advantages and disadvantages, none of which are relevant to the present invention which is concerned only with ultrasonic or acoustic welding.

FIG. 1 shows a typical temperature sensing element 10 including a pair of conductive leads 12, 14 extending slightly outwardly therefrom. The leads 12, 14 are typically formed of nickel, copper, gold, platinum, aluminum or some alloy of one or more such elements. As illustrated in FIG. 2, in order to ultrasonically weld a lead 12 to a multi-stranded extension wire 26, either the lead or the extension wire is mechanically retained in place by a capture fixture 44 of an ultrasonic welding apparatus (in FIG. 2 the extension wire 26 is shown on the bottom of the fixture 44 and the lead 12 is shown on top). The other of the lead 12 or extension wire is engaged by an ultrasonic welding head 16 which causes it to vibrate rapidly against the component held by the capture fixture 44 as a result of the application of ultrasonic pulses. The friction of the vibration causes a weld joint to form at the contact surfaces of the lead 12 and the extension wire 26.

While ultrasonic welding as described is suitable in many applications, problems sometimes occur when the sensing element lead 12 has a diameter or lateral dimension which is substantially different from the diameter or lateral dimension of the extension wire 26 to which it is to be welded. In such situations, the generally smaller sensing element lead 12 is not adequately mechanically retained within the capture fixture and is thereby permitted to move laterally or pivotally (shown in phantom in FIG. 2) within the capture fixture 44 during the welding process resulting in an inadequate weld or a weld in which only a relatively small portion of the sensing element lead 12 firmly engages the extension wire 26. Such movement can result in a weakened weld joint as well as diminished electrical conductivity between the sensing element lead 12 and the extension wire 26 sometimes resulting in errors in the output from the electronic instrumentation.

The present invention comprises an improved method of ultrasonically welding together two conductors of different lateral dimensions in which the foregoing problems are avoided. In employing the improved method of the present invention, the capture fixture of the ultrasonic welding apparatus is selected so that the lateral sides of the capture fixture substantially engage both lateral sides of the extension wire. The sensing element lead is formed by bending or crimping so that first and second laterally extending portions are formed. When the sensing element lead is placed in the capture fixture, the first and second portions of the lead substantially engage or are proximate to opposite lateral walls of the fixture to mechanically retain the electrical lead in place within the fixture and to decrease or limit movement of the electrical lead during the ultrasonic welding process. In this manner, an enhanced weld connection is formed between the lead and the extension wire and the area of engagement between the lead and the extension wire is substantially greater than the area of electrical contact would be if the electrical lead were not so formed.

SUMMARY OF THE INVENTION

Briefly stated, the present invention comprises an improved method of ultrasonically welding together two conductors having different lateral dimensions and, in a preferred embodiment, an electrical lead from a sensing element and an extension conductor. The method comprises selecting an ultrasonic welding capture fixture having lateral sides which are spaced apart by a distance substantially equal to the lateral dimension of a first conductor, having the greatest lateral dimension. The first conductor is placed into the selected fixture so that the first conductor is proximate to or substantially engages both lateral sides of the fixture. The second conductor is formed so that at least a first portion of the second conductor extends laterally beyond a second portion of the second conductor. The second conductor is placed into the selected fixture so that the first portion of the second conductor is proximate to or substantially engages one of the lateral sides of the fixture and the second portion of the second conductor is proximate to or substantially engages the other lateral side of the fixture and so that both the first and second portions of the second conductor substantially engage the first conductor. Ultrasonic energy is applied to one of the conductors within the fixture for moving the one conductor with respect to the other conductor for welding the conductors together.

BRIEF DESCRIPTION OF THE DRAWINGS

The foregoing summary, as well as the following detailed description of preferred embodiments of the present invention, will be better understood when read in conjunction with the attached drawings. In the drawings, there is shown throughout the figures, embodiments which are presently preferred, it being understood, however, that the present invention is not limited to the specific arrangements and instrumentalities disclosed. In the drawings.

DETAILED DESCRIPTION OF PREFERRED EMBODIMENTS

Figure 1:
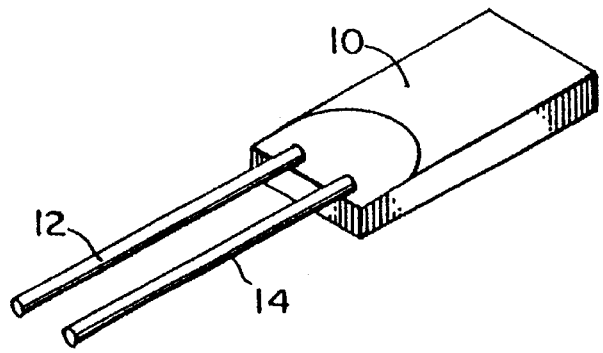
FIG. 1 is a perspective view of a prior art sensing element having generally straight electrical leads extending therefrom.
Figure 3:
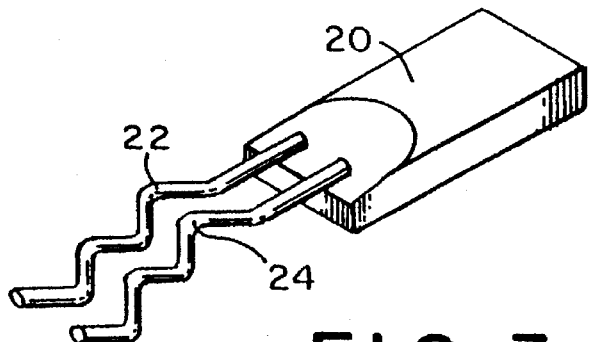
FIG. 3 is a perspective view of a sensing element similar to the element of FIG. 1 but with electrical leads formed in accordance with the present invention.

Referring to the drawings, wherein the same reference numerals are used for indicating like elements throughout the several figures, there is shown in FIG. 3 a sensing element 20 having a pair of electrically conductive leads 22, 24 extending outwardly therefrom. Unlike the sensing element 10 (FIG. 1) in accordance with the prior art, the leads 22, 24 of sensing element 20 have been formed by being bent or crimped so that the leads 22, 24 are not straight. In the embodiment shown in FIG. 3, the leads 22, 24 are formed in a lateral direction into a generally serpentine or "S" pattern. The leads 22, 24 may be formed utilizing any known device such as a crimping tool, pliers, a bending jig or the like. Alternatively, the leads 22, 24 may be formed into the serpentine pattern at the time that the sensing element 20 is formed. The precise time that the leads 22, 24 are formed into the serpentine pattern as well as the means employed for forming the leads 22, 24 into the serpentine pattern will be apparent to those of ordinary skill in the art and should not be considered to be, in any way, a limitation upon the present invention.

As previously discussed, the present invention comprises an improved method for ultrasonically welding together two conductors of different lateral dimensions. In the presently described embodiment, one of the conductors is one of the leads 22 of the sensing element 20. The other conductor is an electrical extension wire 26 which in the present embodiment is formed of a plurality of individual conductive strands 28, all of which are covered by an insulative material 30. It will, of course, be appreciated by those skilled in the art that when making a connection between two conductors, a portion of the insulative material 30 has been removed from the wire strands 28 in order to permit good electrical contact between the wire strands 28 and the sensing element lead 22. It will also be understood by those skilled in the art that the extension wire 26 may comprise a solid conductor rather than multiple strands. For purposes of illustrating the invention, in the present embodiment, the lateral dimension or diameter of the selected electrical lead 22 is illustrated as being substantially smaller than the lateral dimension or diameter of the combined strands 28 of the extension wire 26. It will be appreciated by those skilled in the art that in other applications, the lateral dimension or diameter of the electrical lead 22 may be substantially greater than the lateral dimension or diameter of the extension wire 26 and that the present method is equally applicable without regard to which of the conductors has the greater lateral dimension.

Figure 2:
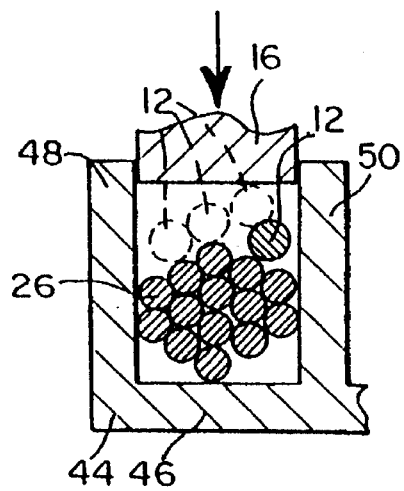
FIG. 2 is a schematic sectional view of a portion of an ultrasonic welding apparatus illustrating the problems encountered in bonding together two conductors having different lateral dimensions in accordance with the prior art.

As previously discussed, a typical ultrasonic welding apparatus includes a stationary welding head 40 and a moving welding head (schematically illustrated as 16 on FIG. 2). The stationary welding head 40 is comprised of a capture fixture 44 having a base 46 and a pair of generally parallel lateral walls 48, 50 perpendicular to the base 46 and spaced apart a predetermined distance.

Figure 4:
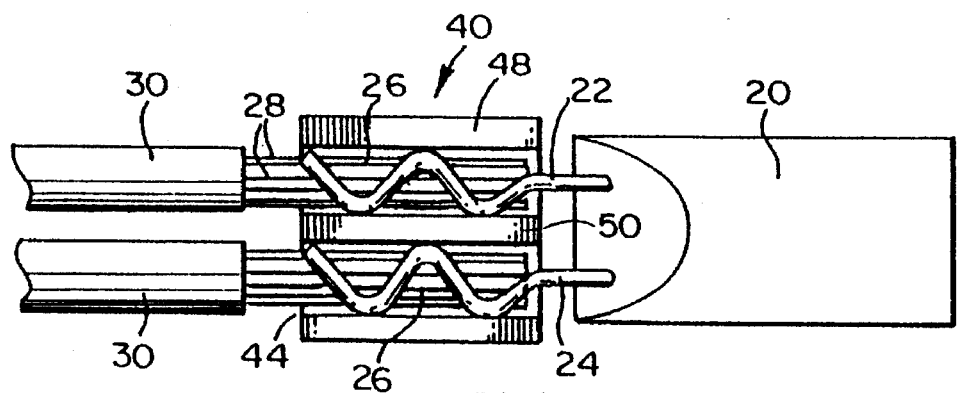
FIG. 4 is a top plan view showing an extension wire and the leads of the sensing element of FIG. 3 in a capture fixture of an ultrasonic welding apparatus.

The capture fixture 44, which is available in differing sizes, is selected so that the distance between the lateral side walls 48, 50 is substantially equal to the lateral dimension or diameter of the extension wire 26. In this manner, the extension wire 26, when installed within the capture fixture 44 as shown in FIGS. 2 and 4, substantially engages or is in close proximity to both lateral side walls 48, 50 to retain the extension wire 26 within the capture fixture 44 and effectively prevent substantial lateral movement of the extension wire 26. The base 46 of the capture fixture 44 may include a plurality of indentations (not shown) extending generally between the lateral side walls 48, 50 which help to retain the extension wire 26 within the capture fixture 44 and help to prevent substantial longitudinal movement of the extension wire 26.

As discussed briefly above, a problem associated with ultrasonic welding of two conductors of differing lateral dimensions was that although the capture fixture 44 adequately retained the conductor having the larger dimension (in the present embodiment, the extension wire 26), the space between the lateral side walls 48, 50 of the capture fixture 44 was substantially greater than the lateral dimension or diameter of the smaller sized conductor (12 on FIG. 2). As a result, during the welding process, the smaller conductor tended to move laterally, pivot, twist, etc. (illustrated in phantom on FIG. 2), so that, in many instances, the resulting weld was inconsistent from component to component, generally was not as strong as it could be and the area in which the smaller sized conductor engaged the larger sized conductor was relatively small, sometimes resulting in a deterioration in mechanical and electrical conductivity between the two conductors.

Figure 5:
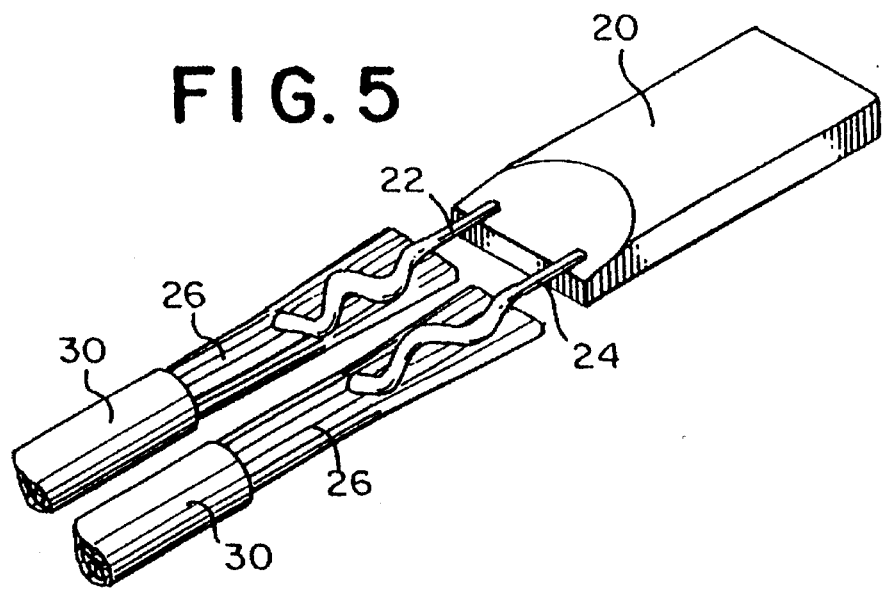
FIG. 5 is a perspective view of the sensing element of FIG. 3 after the leads have been bonded to a pair of extension wires in accordance with the present invention.

As best shown in FIG. 4, when the sensing element lead 22 is installed within the capture fixture 44, because of the manner in which the leads are formed, a first portion of the lead 22 substantially engages or is proximate to lateral side wall 48 and a second portion of the lead 22 substantially engages or is proximate to lateral side wall 50 so that lead 22 is generally mechanically retained within the capture fixture 44. In this manner, substantial lateral movement, pivotal movement, etc., of the lead 22 with respect to the extension wire 26 is prevented and both portions of the lead 22 are in substantial engagement with the extension wire 26. Thus, during the actual ultrasonic welding process, the lead 22 is maintained in substantially the same lateral position as shown in FIG. 4 resulting in a final weld as shown in FIG. 5 which is generally superior to virtually any weld formed in which the lead is straight. In addition, as is also seen in FIG. 5, the area over which the lead 22 is in direct electrical contact with the extension wire 26 is substantially greater than with the prior art lead resulting in enhanced electrical conductivity and improved bonding between the lead 22 and the extension wire 26. It will be appreciated by those skilled in the art that, in some applications, the lead 22 may be formed so that the lateral dimension of the lead 22 is greater than the distance between the lateral side walls 48, 50 of the capture fixture 44 in which case the mechanical pressure maintaining the lead 22 within the capture fixture 44 would be enhanced. All that is necessary is that the lead 22 be formed so that the lateral dimension of the lead, overall, is substantially the same as (slightly less than or slightly greater than) the distance between the lateral side walls 48, 50 of the capture fixture 44 in order to restrict lateral movement of the lead 22 within the fixture 44.

Figure 6A:
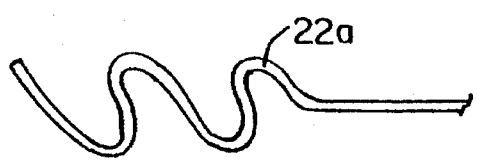
FIGS. 6a–6d show several variations in the way that the electrical leads of a sensing element may be formed in accordance with the present invention.
Figure 6B:
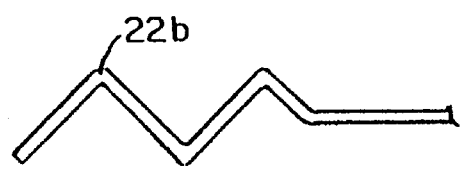
Figure 6C:
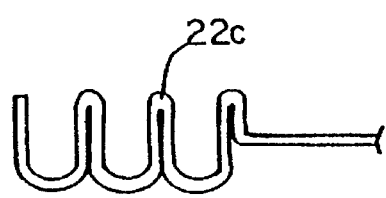
Figure 6D:
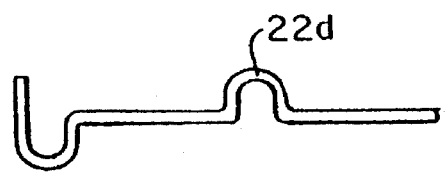

In the embodiment illustrated in FIGS. 3, 4 and 5, the leads 22, 24 are formed in a generally serpentine pattern, almost sinusoidal in top plan view. It will be appreciated by those skilled in the art that the leads 22, 24 may alternatively be formed into many other patterns. FIGS. 6a–6d illustrate four other potential lead patterns including a lead 22a with a slightly more curved serpentine pattern (FIG. 6a), a lead 22b with a zig-zag pattern (FIG. 6c) a lead 22c with a tighter, U-shaped pattern (FIG. 6c), or a lead 22d with a pattern which includes a pair of spaced apart oppositely extending loops (FIG. 6d). It will, of course, be appreciated by those skilled in the art that many other types of patterns may alternatively be employed.

From the foregoing; it can be seen that the present invention comprises an improved method of ultrasonically welding together two conductors of different lateral dimensions. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An improved method of ultrasonically welding together two conductors having different lateral dimensions comprising the steps of:
   (a) selecting a welding capture fixture having lateral sides which are spaced apart by a distance substantially equal to the lateral dimension of a first conductor, having the greatest lateral dimension;
   (b) placing the first conductor into the selected fixture so that the first conductor is proximate to or substantially engages both lateral sides of the fixture;
   (c) forming the second conductor so that at least a first portion of the second conductor extends laterally beyond a second portion of the second conductor;
   (d) placing the second conductor into the selected fixture so that the first portion of the second conductor is proximate to or substantially engages one of the lateral sides of the fixture and the second portion of the second conductor is proximate to or substantially engages the other lateral side of the fixture and so that both the first and second portions of the second conductor substantially engage the first conductor; and
   (e) applying ultrasonic energy to one of the conductors within the fixture for moving the one conductor with respect to the other conductor for welding the conductors together.

2. The method as recited in claim 1 wherein at least one of the conductors is comprised of multiple strands of conductive material.

3. The method as recited in claim 1 wherein at least one of the conductors is generally circular in cross-section.

4. The method as recited in claim 1 wherein the second conductor is formed by bending the second conductor to form the first and second portions.

5. The method as recited in claim 1 wherein the second conductor is formed into a serpentine pattern for establishing the first and second portions.

6. The method as recited in claim 1 wherein the second conductor is formed into a zig-zag pattern to establish the first and second portions.

7. A weld formed between the conductors of differing lateral dimensions in accordance with the method of claim 1.

8. An improved method of ultrasonically welding together an electrical lead from a sensing element and an extension conductor wherein the extension conductor has a lateral dimension which is greater than the lateral dimension of the electrical lead comprising the steps of:
   (a) selecting a welding capture fixture having lateral sides which are spaced apart by a distance substantially equal to the lateral dimension of the extension conductor;
   (b) placing the extension conductor into the selected fixture so that the extension conductor is proximate to or substantially engages both lateral sides of the fixture;
   (c) forming the electrical lead of the sensing element into a pattern so that at least a first portion of the electrical lead extends laterally beyond a second portion of the electrical lead;
   (d) placing the electrical lead into the selected fixture so that the first portion of the electrical lead is proximate to or substantially engages one of the lateral sides of the fixture and the second portion of the electrical lead is proximate to or substantially engages the other lateral side of the fixture and so that both the first and second portions of the electrical lead substantially engage the extension conductor; and
   (e) applying ultrasonic energy to one of the electrical lead and the extension conductor for movement with respect to the other of the electrical lead and the extension conductor for welding the electrical lead to the extension conductor.

9. The method as recited in claim 8 wherein the sensing element is a temperature sensing device.

10. The method as recited in claim 8 wherein the extension conductor comprises multi-stranded wire.

11. The method as recited in claim 8 wherein the electrical lead is bent to establish the first and second portions.

12. The method as recited in claim 8 wherein the electrical lead is formed into a serpentine pattern.

13. A sensing element having an electrical lead welded to an extension conductor having a lateral dimension which is greater than the lateral dimension of the electrical lead in accordance with the method of claim 8.

* * * * *